(No Model.) 4 Sheets—Sheet 1.
C. J. VAN DEPOELE.
SYSTEM OF SWITCHING FOR CONDUIT ELECTRIC RAILWAYS.
No. 417,121. Patented Dec. 10, 1889.
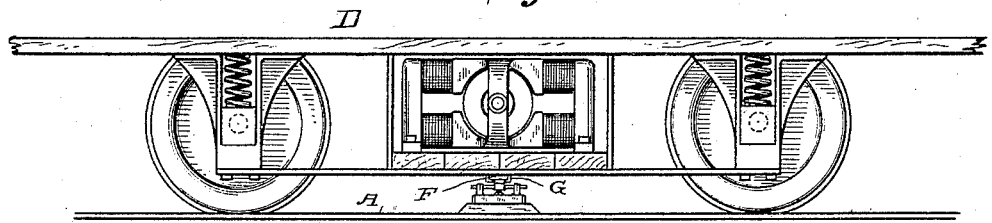
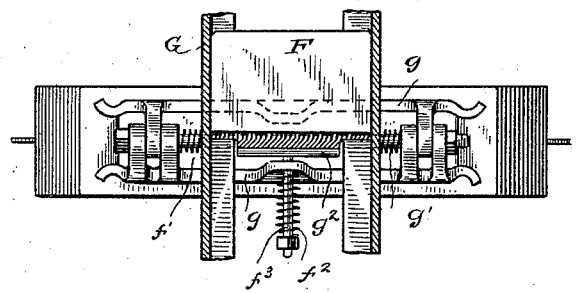
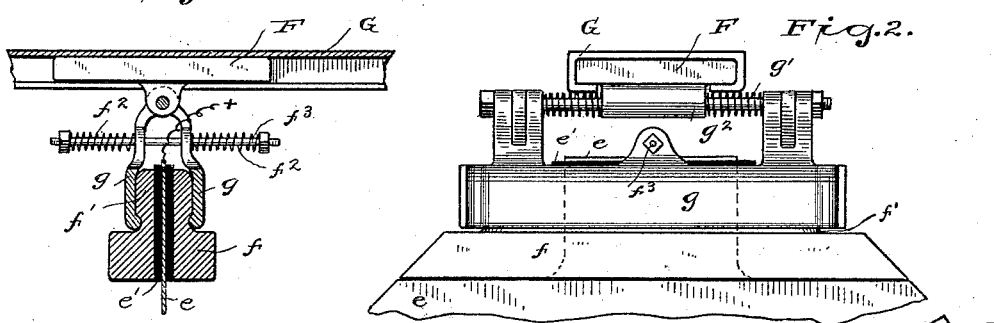
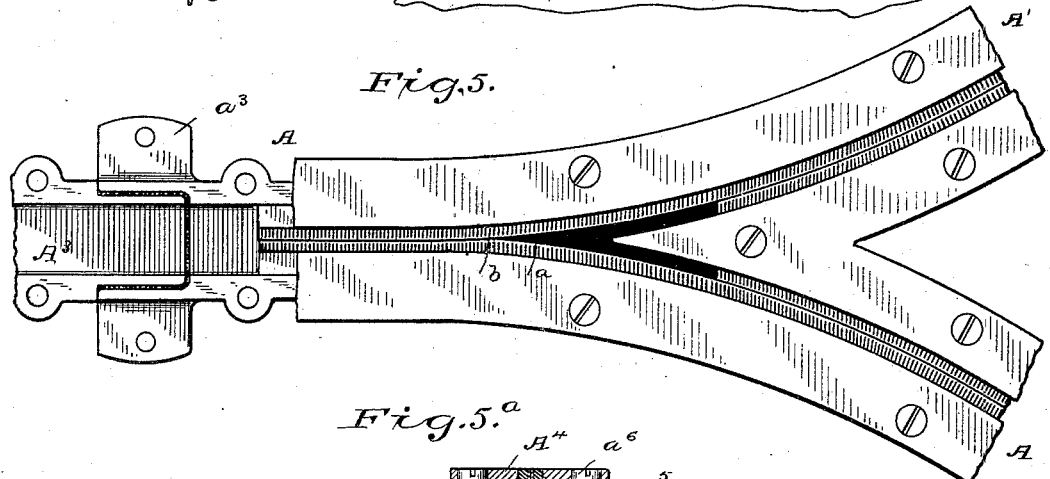
Witnesses
H. A. Lamb
C. S. Sturtevant
Inventor
Charles J. VanDepoele
By Frankland Jannus
Attorney

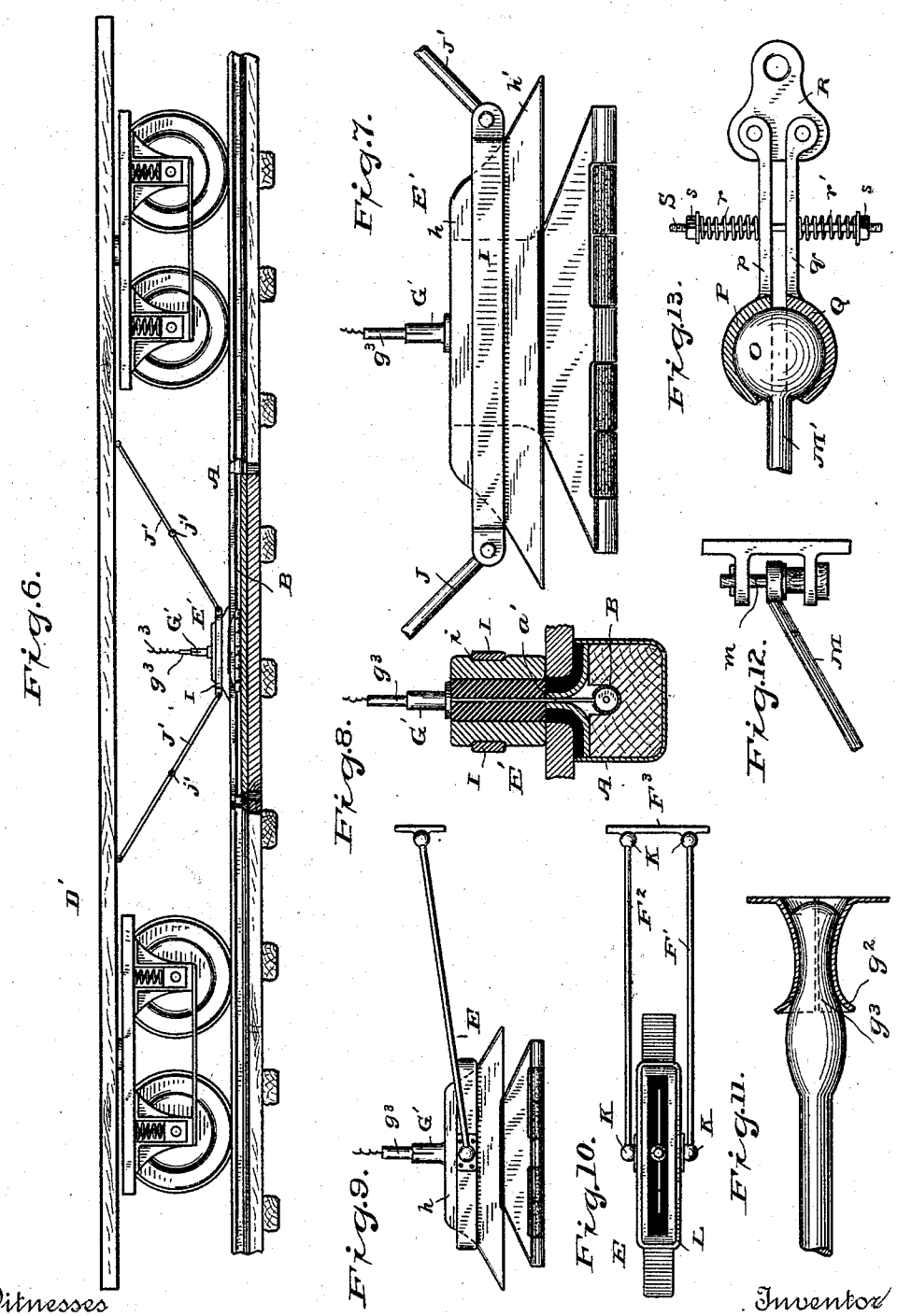

(No Model.) 4 Sheets—Sheet 3.
C. J. VAN DEPOELE.
SYSTEM OF SWITCHING FOR CONDUIT ELECTRIC RAILWAYS.
No. 417,121. Patented Dec. 10, 1889.
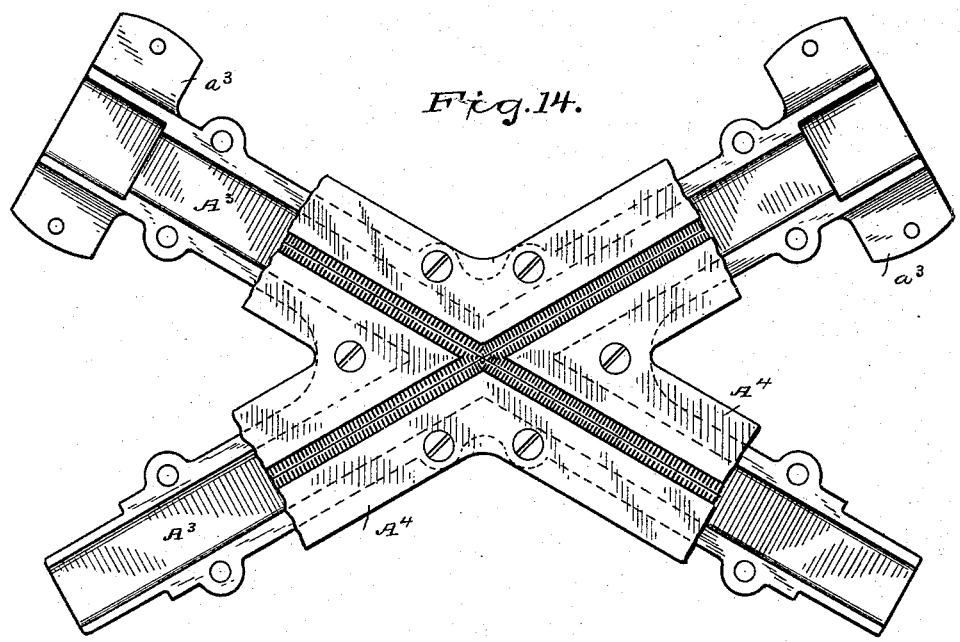
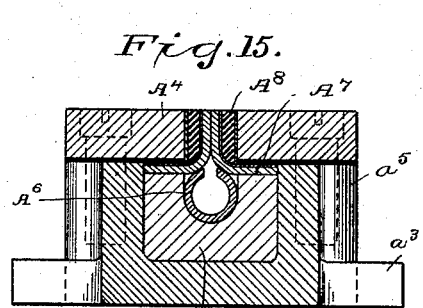
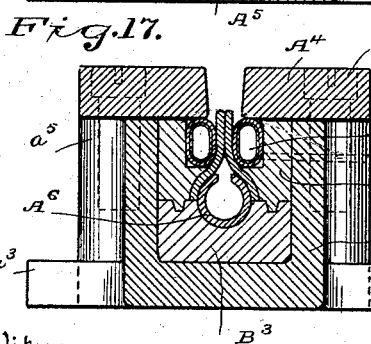
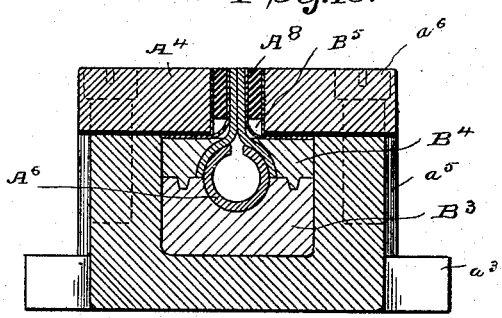
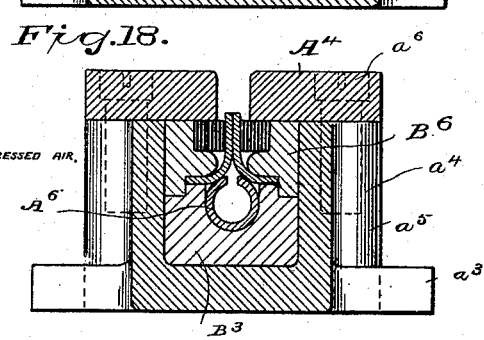
Witnesses
H. A. Lamb
C. L. Sturtevant
Inventor
Charles J. Van Depoele
By Frankland Jannus
Attorney (No Model.) 4 Sheets—Sheet 4.
C. J. VAN DEPOELE.
SYSTEM OF SWITCHING FOR CONDUIT ELECTRIC RAILWAYS.
No. 417,121. Patented Dec. 10, 1889.
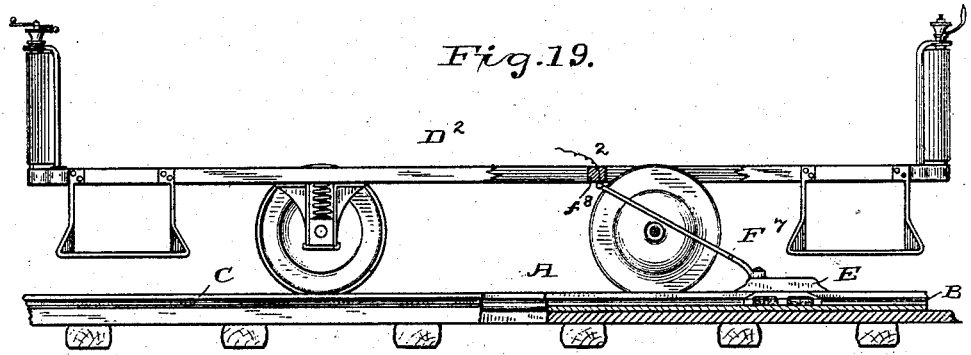
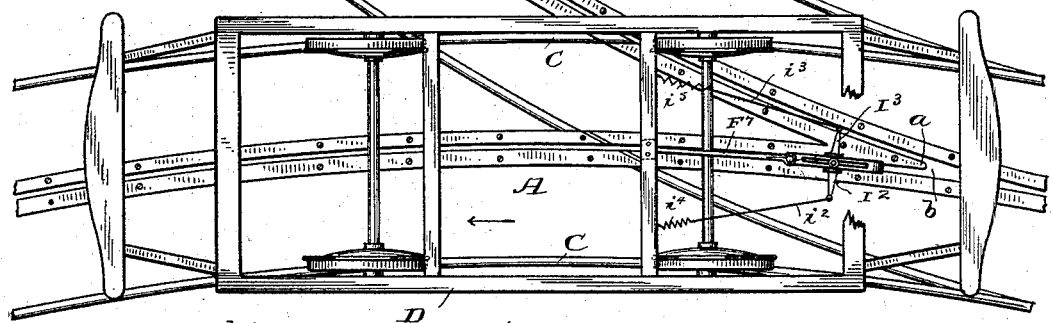
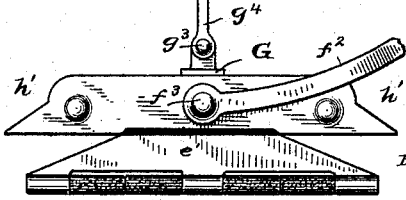
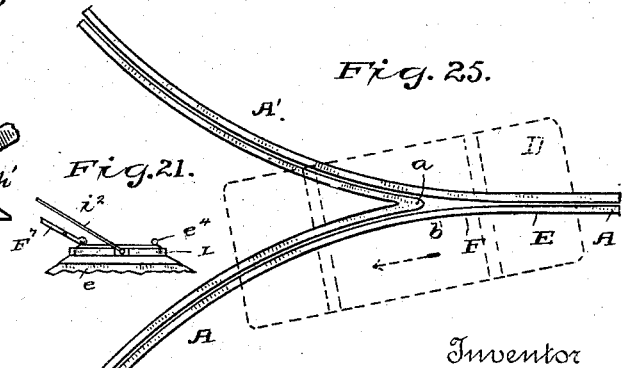
Witnesses
H. A. Lamb
C. L. Sturtevant
Inventor
Charles J. Van Depoele
Frankland James
Attorney

UNITED STATES PATENT OFFICE.

CHARLES J. VAN DEPOELE, OF LYNN, MASSACHUSETTS.

SYSTEM OF SWITCHING FOR CONDUIT ELECTRIC RAILWAYS.

SPECIFICATION forming part of Letters Patent No. 417,121, dated December 10, 1889.

Application filed February 2, 1889. Serial No. 298,432. (No model.)

*To all whom it may concern:*

Be it known that I, CHARLES J. VAN DEPOELE, a citizen of the United States, residing at Lynn, in the county of Essex and State of Massachusetts, have invented certain new and useful Improvements in Systems of Switching for Conduit Electric Railways; and I do hereby declare the following to be a full, clear, and exact description of the invention, such as will enable others skilled in the art to which it appertains to make and use the same.

My invention relates to improvements in electric railways of the class in which main supply-conductors are carried in a subsurface conduit; and it consists in a system of switches for passing the contact-plow from a main to a branch line or turn-out, and vice versa, together with the various details of construction and arrangement of a system embodying my invention, which will be hereinafter described, and referred to in the appended claims.

The principal features of the conduit, in connection with which the present invention is illustrated are shown, described, and claimed in applications filed January 5, 1889, Serial Nos. 294,506 and 295,507.

In the drawings, Figure 1 is a view in elevation showing the frame of a car and the upper portion of the conductor-containing conduit, together with a contact-plow and connections between the plow and car. Fig. 2 is a detail showing the connections between the plow and the car. Fig. 3 is an end view, partly in section, showing the contact-plow and means for attaching the same to the car. Fig. 4 is a plan view, partly in section, also showing the contact-plow and its connections with the car. Fig. 5 is a plan view, partly broken away, showing a portion of the conduit, including a switch or turn-out. Fig. 5ᵃ is a sectional elevation on the line 5ᵃ of Fig. 5. Fig. 6 is a view in elevation showing a different form of car, also provided with a contact-plow and connections embodying my invention, together with a portion of the roadway and conduit, the roadway and conduit being partly in section. Fig. 7 is an enlarged view in elevation of the contact-plow seen in Fig. 6. Fig. 8 is a transverse sectional elevation of the contact-plow and conduit seen in Fig. 6. Fig. 9 is a detail view in elevation showing a contact-plow with slightly-different connections between it and the car. Fig. 10 is a plan view of the plow shown in Fig. 9. Fig. 11 is a detail view of a form of detachable connection for attaching the contact-plow and circuit-connections to the car. Fig. 12 shows a different form of detachable connection. Fig. 13 is an elevation, partly in section, of a form of universal and adjustable plow-detaching connection. Fig. 14 is a plan view of a portion of the conduit, showing the arrangement thereof at crossings, portions of the surface-plates being removed. Figs. 15, 16, 17, and 18 are enlarged transverse sectional elevations showing different forms of arranging the conductor-supporting and slot-closing devices on the interior of the conduit. Fig. 19 is a view in elevation, partly in section, showing the frame of a car and a portion of the conduit, together with a contact-plow and slightly-different form of connection between the same and the car. Fig. 20 is a plan view of the frame of a car, showing also a portion of the main and branch conduit and truck, together with a contact-plow similar to that seen in Fig. 19. Fig. 21 is a detail view of the contact-plow seen in Figs. 19 and 20. Figs. 22 and 23 are views in plan and side elevation, respectively, of slightly-different means for connecting a contact-plow for use under the center of a car. Fig. 24 is a detail illustrating a slightly-different construction of the gripping devices, seen in Figs. 22 and 23. Fig. 25 is a diagrammatic view showing a branching conduit and a car, indicated in dotted lines as approaching the switch-point of the branch.

As indicated in the drawings, A is a subsurface conduit, in which the supply conductor or conductors B of an electric railway or other system are carried.

C C are the track-rails, supporting the carrying-wheels of the cars D D′ D².

E is a traveling contact device, hereinafter referred to as the "plow," part of which extends into the conduit and engages the conductor or conductors B.

As seen in Figs. 1, 2, 3, and 4, the plow is connected with the car by means of a pivoted cross-head F, which moves in a slotted channel G, secured to some convenient part of the truck or lower portion of the car, and in which the cross-head G is free to move transversely of the car in order to accommodate itself to the positions assumed by the car on curved portions of the track or when passing the switch-point.

As indicated in Figs. 1 to 4, the plow comprises a thin metallic blade $e$, adapted to pass between the slot-closing packing constituting a feature of the improved conduit and described in my above-mentioned application, and hereinafter referred to. The plow E extends above the surface of the conduit and is inclosed by a casing $e'$ of good insulating material. The insulation $e'$ is protected by an exterior metallic covering or armor $f$, which is sloped off at its extremities, in order to clear away or deflect any movable substances that may be along its line of travel. The extremities of the plow E are also sloped outwardly and inwardly, so that when passing along the conduit they will separate the slot-closing packing in an upward direction. The upper portion of the armor $f$ of the plow is formed into an elongated head $f'$. The plow is connected with the cross-head F by a spring-clutch formed of a pair of strong metallic jaws $g\,g$, engaging opposite sides of the head $f'$, and hinged to a spindle $g'$, mounted in a projection $g^2$ at the under side of the cross-head F. The jaws $g\,g$ are held against the sides of the head $f'$ with any desired degree of pressure by suitable springs—as, for example, the adjustable spring $f^2$, supported about a rod $f^3$, provided with adjusting-nuts at its outer extremities, by means of which the pressure of the jaws against the head may be adjusted as desired. The jaws $g\,g$ may also be curved outwardly at their extremities to facilitate their moving out of engagement with the head $f'$ in the event of the plow meeting a dangerous obstruction. It will be seen that with this arrangement the plow E may assume any desired position transversely of the car, but that its axial relation thereto is fixed, so that any sidewise swing of either end of the car with respect to the track will be communicated to the plow and tend to turn it upon its axis, thereby causing its extremities to bear more upon one side of the slot than another, the said sidewise tendency of the plow being always toward the outer side of a curve or branch and in accordance with the direction taken by the car.

According to my invention no movable tongues are required at the junction of branch or turn-out with the main conduit, since by properly arranging the plow with respect to the car and providing suitable connection between the plow and car the plow can be so perfectly guided and controlled that while moved by its connection with the car it will conform to the movement of the latter and traverses the desired path without manual intervention of any kind. This principle is illustrated diagrammatically in Fig. 25, the car D being shown in such position with respect to the main and branch conduits that its front wheels have passed upon the curved portion of the track corresponding with the conduit A, thereby changing its direction, so that a plow located under the central portion of the car would have the direction of the car communicated to it before reaching the point of junction between the main and branch conduits, and thus automatically be directed to the proper channel by being caused to bear against the unbroken outer wall of the slot.

In Fig. 5 is seen an enlarged detail of a portion of the conduit, including a switch or turn-out. A is the main and A' the branch conduit, the main and branch uniting at the point $b$. The side walls of the slot of the main conduit A diverge at the switch-point $b$, remaining unbroken and following one the main and the other the branch conduits, so that by causing contact devices to bear against the unbroken outer walls of the slot of the conduit to which the car is being directed by the track-switches it will safely pass the point of divergence, which is represented by a triangular piece of insulating material $a$, which should be of hard and durable nature, as the friction of the passing plows is necessarily considerable.

In Fig. 1 is indicated a car of the style ordinarily used on street-railways having two separately-mounted pairs of wheels.

In Fig. 6 my invention is seen in connection with a car having a pivoted truck under each end. As shown, the contact-plow is located under the center of the car and connected directly thereto, instead of to the truck, as just described. The arrangement seen in Fig. 6 is adapted for operation in either direction, and will therefore require no attention when the car has reached the end of its run and it is desired to move it in the other direction without turning.

As seen in Fig. 6 and on an enlarged scale in Figs. 7 and 8, the plow E' is of the same general construction as described with reference to the plow E, and it might be connected with the car by the same species of detachable connection as there shown; but another form of connection is illustrated, which comprises a resilient band or bands I, which embrace the upper portion of the exterior protective casing $h$, fitting into shallow longitudinal recesses $i$ formed therein.

As seen in Fig. 6, the bands I are connected with the car by resilient hinged links J J', which are hinged to the extremities of the bands I and similarly attached to the frame of the car, so that when the car is moving in one direction the plow will be propelled by the link J and when moving in the opposite direction by the link J'. A detachable electric connection G' is provided, the said connection being substantially the same as that shown on enlarged scale in Fig. 11, and comprising a tapering or contracted resilient socket $g^2$, in which is fitted and held by the resiliency of the said socket $g^2$ a tapering plug $g^3$, to which is attached a suitable electric conductor 3, to be connected to the motor-circuit as desired. The links J J', connecting the plow E' and the car D', may be flat steel bars having sufficient flexibility to prevent injury to the plow on sharp curves, and they are provided with hinged joints $j\ j'$, so that should the progress of the plow be impeded the spring-band I I will be forcibly detached from the plow and its destruction or injury prevented. Being jointed, the links $j\ j'$ will permit the upward movement of the band or bands by which they are attached to the plow, and the tension of said bands is adjusted to permit of their detachment before the plow has received any serious injury. The working-conductor 3 will also be detached when sufficient resistance is encountered to detach the bands I from the plow, thereby rupturing the motor-circuit and stopping the car, after which the difficulty can be removed and the parts replaced in operative relation.

In Fig. 11 is shown a slip-joint comprising a tapering resilient socket $g^2$, in which is fitted a tapering plug $g^3$. The plug $g^3$ may be fitted to the extremity of the connection F' to permit its detachment from the car instead of from the plow, if desired.

Another form of detachable connection is seen in Fig. 12, where the draft-rod M, which may be the link F, is connected to the car by a wooden pivot-pin $m$, which should be of a size calculated to break before the plow could be damaged on meeting an obstruction.

In Fig. 13 is shown an adjustable detachable connection. M' represents the draft-rod or connection between the plow and car. The extremity or head O of the draft-rod is spherical in form and inclosed between semi-spherical cup-shaped extensions P Q, carried by arms $p\ q$, which are pivotally mounted upon a plate R. Adjustable tension-springs $r\ r'$ are placed about a central screw-threaded bolt S, passing through apertures in the arms $p\ q$ and provided with nuts $s\ s$ at either extremity, whereby the tension of the springs $r\ r'$ upon the arms $p\ q$ and cups P Q may be adjusted as desired. With this construction it will be seen that the tension-springs $r\ r'$ can be so adjusted that any undue strain upon the rod M' will pull the head O out from between its inclosing-cups P Q, the head O and cups P Q being made of such relative sizes as are required in practice. The plate R is provided with a suitable aperture for ready connection to a bolt or hook upon the car. The draft-rod M' is intended to be formed upon the extremity of the connection or link F or its equivalent, and to be detachably connected to the car, so that instead of turning the car at the end of its run the plate R and detachable connections can be removed and then similarly connected to the opposite end of the car.

Instead of connecting the plow with the car by means of the jointed links J J', attached to either extremity of the resilient clamp I, it may be connected, as shown in Figs. 9 and 10, by two parallel arms F' F², said arms being connected to the frame of the car or to a base-piece F³ by ball-and-socket joint K and by similar joints to the clamp or detachable connection I. The working-conductor extending from the blade $e'$ is also detachably connected to the plow E, as by the slip-joint $g^3$ G'.

Another desirable form of attachment is shown in Figs. 22 and 23. As there shown, the exterior armor of the plow is provided with semi-spherical projections $e^3$, upon which are sprung the extremities of the arms $f^4\ f^5$ of a fork attached to a flexible or resilient draft-rod F⁵. The extremities of the arms $f^4\ f^5$ are formed cup-shaped, as indicated at $f^6$, to fit over the projections $e^3$ and constitute a detachable hinged connection.

As indicated in Fig. 23, projections $e^3$ may be located at either end of the plow, so that when desired the draft-connection may be from either end thereof, instead of from the center, as shown in Fig. 22. For better adjustment the arms $f^4\ f^5$ may be made rigid, or nearly so, and hinged to the draft-rod F⁵, as indicated in Fig. 24, the said arms $f^4\ f^5$ being in this case provided with an adjustable tension-spring $f^7$, whereby the pressure required to detach them from the plow may be adjusted as desired.

Under some circumstances it may be desired to locate the plow in rear of the hind wheels of the vehicle, as indicated in Figs. 19 and 20. A plow when attached to a car in this position would not ordinarily operate as when located under the center of the car, as previously described, since the rear end of the car in passing a switch assumes an opposite position with respect to the switch from that of its front end. With such an arrangement, therefore, additional means are required to insure the proper movement of the plow.

As indicated in Figs. 19, 20, and 21, the plow is connected with the car by a draft-rod F⁷, which is suitably attached to one of the rear timbers of the car at $f^8$ and connected to the front end of the plow by a universal slip-joint similar to that illustrated on an enlarged scale in Fig. 13. To a resilient clamp I, detachably connected with the plow, as previously described, are secured laterally-projecting arms I² I³. The extremities of the arms I² I³ are connected with the car in about the same transverse plane as is the draft-rod F⁷ by connecting-rods $i^2\ i^3$, and each of the connections $i^2\ i^3$ includes a tension-spring $i^4\ i^5$. When on curved portions of track, the tendency of the draft-connections F⁷ to deflect the front of the plow toward the inside of the curve will be counteracted and overcome by the tension-spring attached to the arm upon the same side as the switch or diverging conduit, placing said spring under working strain and removing all strain from that upon the opposite side. The effect of this will be that the spring under strain will pull upon the plow, tending to turn it upon its central axis and to hold its front end firmly against the desired side of the conduit—that is, against the unbroken wall thereof.

As seen in Fig. 20, the car is passing upon the curve of a switch, its front end following the direction of the track upon which it is moving, but its rear end being swung toward the other track, so that the tendency of the draft-rod $F^7$ would be to direct the plow to the conduit $A'$. This tendency is, however, overcome by the tension of the spring $i^5$, acting through connection $i^3$ upon the arm $I^3$. The spring $i^4$, being under tension, is inactive, permitting the said spring $i^5$ to exert its full power in holding the front end of the plow against the outer wall of the conduit.

As indicated in Figs. 19, 20, and 21, the draft-rod $F^7$ is divided at its extremity and spring-held about a spherical projection $i^4$, from which it will be readily detached in the event of the plow meeting an obstruction. The said draft-rod also in this instance acts as the electrical connection to the blade $e$ by the conductor leading to the motor-circuit. The arms $I^2$ $I^3$, being secured to the detachable clamp I, would also become detached from the plow whenever its progress is forcibly impeded.

The arrangement at points where two or more lines of conduit intersect and cross is indicated in Fig. 14. Since the plow separates the slot-closing packing with an upward movement on account of the downward and forward extension of the blade $e$, and since at intersecting points the crossing conduits are usually arranged in straight lines, the walls of the different conductors may come together, as indicated, for, since the direction of the car and of the plow will be in a straight line at that point, the plow will follow the desired path without difficulty.

The form of conduit I prefer to employ is made in lengths of, say, six or eight feet, and is desirably made in the form of a cast-iron trough $A^3$, upon which are formed at desired intervals feet $a^3$, by which the sections of conduit are supported upon the cross-ties. The side walls $a^4$ are of only sufficient thickness to give the necessary structural strength, and at intervals of eighteen inches (more or less) they are provided with enlarged portions $a^5$, which are formed with vertical screw-threaded openings to receive the bolts $a^6$, by which the surface or capping plates $A^4$ are secured in position.

The several sections of which the conduit is composed are united by slip-joints, as indicated in Fig. 5, sufficient space being left between the metal of the connecting parts to contain a filling of water-proof material that will not become hard or brittle, but possess some flexibility under all conditions. A suitable material would be soft rubber or a fabric coated or impregnated with asphaltum, tar, or similar thick water-proof substance.

As seen in Fig. $5^a$, a filling of wood $A^5$ is placed within the trough $A^3$ and formed with a groove along its upper surface, within which is supported a slitted steel tube $A^6$, constituting the electric conductor. The conductor $A^6$ may, however, be formed of any desirable metal, as copper or phosphor-bronze; but I find steel tubes especially desirable, since they can be made of such hardness as to possess great durability, and when of sufficient size will possess the necessary conductivity. Upon each side of the slot of the conductor upon the upper edges of the wooden filling $A^5$ are secured continuous strips of leather $A^7$, which may be of sufficient width to extend upward between the surface of the slot of the capping-plates $A^4$. The upper portions of the leather strips $A^7$ are backed by strips of rubber $A^8$ or other flexible material, thus completely closing the opening between the capping-plates $A^4$. This construction is indicated in Figs. $5^a$ and 15. In Fig. 16 a slightly-different construction is seen, the wooden filling being formed in separate pieces. As there shown, a grooved base-piece $B^3$ is let in the trough $A^3$ and the slitted tubular conductor placed thereon. The leather strips $A^7$ are then led against the sides of the upper portion of the conductor, where they are firmly secured by wooden strips $B^4$, fitted upon each side of the upper portion of the conductor, so as to tightly clamp the leather thereagainst and completely fill the trough $A^3$. Strips $B^5$ of fabric—such as canvas—are then placed each side of the wooden filling of the conduit and extended up upon the exterior surface of the leather strips, and to the upper edges of the strips of fabric $B^5$ are secured rubber cushion-strips $A^8$, which, as in the previous instances, act against the upper portions of the leather strips to keep them tightly pressed together and the slot completely closed. The rubber cushions may be secured directly to the leather strips; but by securing the said cushions to the strips of fabric the leather strips will be rendered readily removable. Furthermore, it is desired to freely lubricate the leather by saturating it with oil and plumbago or other suitable material, which might soak through and destroy the rubber cushions, so that by interposing the fabric $B^5$ and coating the same with an impervious material not affected by lubrications the life of the rubber cushions will be indefinite.

In Fig. 18 a slightly-different construction is shown, in which the rubber cushions are seated in grooves formed in the strips $B^6$, but do not extend into the slot between the capping-plates $A^4$.

In Fig. 17 is seen a construction similar to that in Fig. 18, except that the rubber cushions by which the leather strips are held together are in the form of elastic tubes $A^9$, which by virtue of their elasticity will act to press the leather strips closely together and keep the slots closed; but with this form I may further increase the effect of the cushions A⁹ by keeping them supplied with compressed air, as described and claimed in my said prior application.

It will be understood that the various forms or parts herein shown may be applied as found convenient or desirable and that the particular construction or character of the vehicles in connection with which the system and apparatus are used is immaterial. Suitable switches are, of course, to be placed in the track to correspond with those in the conduit. I do not limit myself to the precise details shown and described, as many modifications may be made without departing from the spirit of the invention.

Having described my invention, what I claim, and desire to secure by Letters Patent, is—

1. In electric railways, the combination of main and branch slotted conduits, the slots in said conduits being closed by flexible packing, a contact-plow moving between and separating said packing in its passage, a car arranged to move along the line of the main or branch conduits, and connections between the car and contact-plow for holding said plow toward the unbroken wall of the slot-closing packing of the conduit when passing a branch or turn-out.

2. In electric railways, the combination of a slotted conduit, a contact-plow moving in the slot, a car adapted to follow the direction of the conduit, and positive laterally-elastic connections between the car and the contact-plow tending to maintain parallelism between the car and plow, whereby the forward end of the plow is held against the outer unbroken wall of the slot when traversing curved portions of the conduit.

3. In electric railways, the combination of main and branch slotted conduits, the slots in the conduits being closed by flexible packing, a plow moving in the slot between the said packings, a vehicle arranged to follow the main or branch circuit, and connections between the vehicle and the plow, whereby the latter is held against the packing of the outer side of the slot when passing curved portions of the conduit.

4. In electric railways, the combination of main and branch slotted conduits, the slots in the conduits being closed by flexible packing, a contact-plow, a moving vehicle, and connections between the plow and the vehicle, said connections maintaining the plow in a position in rear of the front wheels thereof and acting to hold it against the packing of the outer wall of the slot when traversing curves or switches.

5. In electric railways, the combination, with a slotted conduit, a contact-plow, and a moving vehicle, of detachable mechanical connections for propelling the plow and jointed positive connections between the detachable connections and the vehicle, substantially as described.

6. In electric railways, the combination, with main and branch slotted conduits, the slots in the conduit being closed by flexible packing, and a contact-plow moving in the slot between the said packing, of adjustable spring jaws or clamps engaging the plow and positive connections between the said jaws or clamps and the car.

7. The combination, with main and branch conduits the surface slots of which are closed by non-metallic flexible packing, of a switch-point at the intersection of the branching conduits, formed of hard insulating material, against which the unbroken walls of the slot-closing packing rest, substantially as described.

8. The combination of main and branching conduits, flexible slot-closing packing therefor, and a switch-point of hard insulating material at the point of divergence of the main and branch conduits, substantially as described.

9. In electric railways, the combination, with two or more crossing lines of conduits closed by flexible surface packing, of a crossing therefor consisting of a surface plate and comprising intersecting slots in the flexible packing, substantially as described.

10. In electric railways, a conduit formed of consecutive sections of metallic troughs united by slip-joints having a water-proof non-metallic packing, substantially as described.

11. In electric railways, a conduit formed of consecutive sections of metallic troughs united by slip-joints having a water-proof non-metallic packing, an insulating-filling for the trough of the conduit, and metallic surface plates secured along the upper edges thereof and separated to form a continuous slot giving access to the conductor-containing packing.

12. In electric railways, the combination of a metallic trough or casing, a suitable insulating-lining partly filling the same, a slitted tubular conductor in the groove of the lining, flexible strips of insulating material arranged along each side of the upper part of the conductor to close the slot therein, additional strips of insulating material located within the trough and acting to press the said strips closely upon the conductor to fill up the trough, thereby excluding water, and elastic tubular cushions arranged along the upper portions of the flexible conductor-inclosing strips and acting to press them together to completely inclose the conductor, substantially as described.

13. In electric railways, a conduit comprising a metallic trough or casing, a filling for said trough consisting of one or more pieces or sections of insulating material, as wood, made water proof by a suitable insulating compound or paint, and a metallic conductor inclosed within the insulating-lining, flexible strips of insulating material extending from the upper portion of the conductor to the exterior of the insulating-filling, and elastic cushions arranged on opposite sides of the conductor-inclosing strips and acting to normally press them together, thereby completely isolating the conductor, substantially as described.

14. In electric railways, the combination of a metallic casing or trough, a grooved wooden lining for the lower portion thereof, a conductor in the groove of the lining, wooden strips arranged within the trough upon each side of the conductor, so as to completely fill the trough and inclose the conductor, and slot-closing packing-strips extending from the edges of the conductor upward into the slot between the capping-plates, whereby the metallic casing is completely filled and the conductor almost completely inclosed, substantially as described.

15. In electric railways, the combination of a metallic casing or trough, a grooved wooden lining for the lower portion thereof, a slitted tubular conductor in the groove of the lining, flexible slot-closing packing-strips arranged along the upper sides of the conductor and extending upwardly, additional wooden strips arranged along each side of the conductor and acting to fill up the trough and to securely clamp the packing-strips against the conductor, and elastic cushions pressing the conductor-protecting strips together, substantially as described.

16. In electric railways, the combination of a metallic trough or casing, a suitable insulating-lining partly filling the same, a slitted tubular conductor in the groove of the lining, flexible strips of insulating material arranged along each side of the upper part of the conductor to close the slot therein, additional strips of insulating material located within the trough and acting to press the said strips closely upon the conductor and to fill up the trough, thereby excluding water, and elastic tubular cushions arranged along the upper portions of the flexible conductor-inclosing strips and acting to press them together to completely inclose the conductor, and means for supplying compressed air to the interior of said tubular cushions to increase their pressure upon the slot-closing strips as desired, substantially as described.

17. In electric railways, a conduit comprising a metallic trough or casing, a filling for said trough, consisting of one or more pieces or sections of insulating material, as wood, shaped to fit the casing and to receive the conductor, a metallic conductor within the insulating-filling of the conduit, and strips of flexible material covering and inclosing the conductor.

18. In electric railways, a conduit comprising a metallic trough or casing, an insulating-support partially filling said casing and adapted to receive and sustain an electric conductor, strips of flexible material covering and inclosing the upper portions of the conductor, and additional strips of wood or other insulating material arranged above the insulating-conductor support and securing the flexible strips in desired position and filling the conduit-casing, elastic cushions supported by the last-mentioned strips and bearing against the conductor-protecting strips, and capping-plates arranged along the upper edges of the metallic casing and extending over the conductor-protecting strips.

In testimony whereof I have signed this specification in the presence of two subscribing witnesses.

CHARLES J. VAN DEPOELE.

Witnesses:
FRANKLAND JANNUS,
J. W. GIBBONEY.